Nov. 29, 1966

W. MESKAT

3,288,077

MACHINE FOR WORKING AND SIMULTANEOUSLY DELIVERING OR
CONVEYING LIQUIDS, VISCOUS OR PLASTIC
COMPOSITIONS AND POWDERS

Filed Aug. 20, 1965

INVENTOR.
Walter Meskat
BY Burgess, Dinklage & Sprung
ATTORNEYS

INVENTOR.
Walter Meskat
BY Burgess, Dinklage & Sprung
ATTORNEYS

Nov. 29, 1966   W. MESKAT   3,288,077
MACHINE FOR WORKING AND SIMULTANEOUSLY DELIVERING OR
CONVEYING LIQUIDS, VISCOUS OR PLASTIC
COMPOSITIONS AND POWDERS
Filed Aug. 20, 1965   10 Sheets-Sheet 4

INVENTOR.
Walter Meskat
BY
ATTORNEYS

INVENTOR.
Walter Meskat

INVENTOR.
Walter Meskat

United States Patent Office 3,288,077
Patented Nov. 29, 1966

3,288,077
MACHINE FOR WORKING AND SIMULTANEOUSLY DELIVERING OR CONVEYING LIQUIDS, VISCOUS OR PLASTIC COMPOSITIONS AND POWDERS
Walter Meskat, Leverkusen, Germany, assignor to Farbenfabriken Bayer Aktiengesellschaft, Leverkusen, Germany, a corporation of Germany
Filed Aug. 20, 1965, Ser. No. 481,322
Claims priority, application Germany, Sept. 11, 1964, F 43,960
12 Claims. (Cl. 103—128)

This invention relates to a machine for working and simultaneously conveying or delivering liquids, viscous or plastic compositions and powders, which comprises at least two screws which are arranged in a common housing and which are each provided with an eccentric core.

In known machines of this kind, the adjacent screws rotate in opposite directions. Their flight lands and grooves do not intermesh, so that the threads can become blocked with parts of the material being worked. As a result of this, these portions of the material are not mechanically worked along with the rest of it, which impairs the mixing effect. In addition, machines of this kind have the disadvantage that difficulties are encountered when working with plastic composition or powders, with the result that these machines are not always able uniformly to deliver or convey compositions of this kind.

It has now been found that these disadvantages can be obviated if, in accordance with the present invention, the central axes of the cores of the adjacent screws are arranged eccentrically relative to the screw-driving spindles rotating in the same direction, in such a way that the flight lands of one screw engage in the grooves of the adjacent screw.

In this way, the crescent-shaped spaces between the flight lands and the housing, as well as the wedge-shaped spaces between the flight lands of one screw and the core of the adjacent screw, are in a state of perpetual change during the parallel rotation of the screws, so that, in addition to the shearing effect to which the compositions are subjected when delivered or conveyed between intermeshing screws, they are exposed to an additional, more intense shearing effect.

In one advantageous embodiment of the invention, the central axes of the flight lands are also arranged eccentrically relative to the spindles driving the screws.

Embodiments of the invention are illustrated by way of example in the accompanying drawings, wherein.

Figure 1:
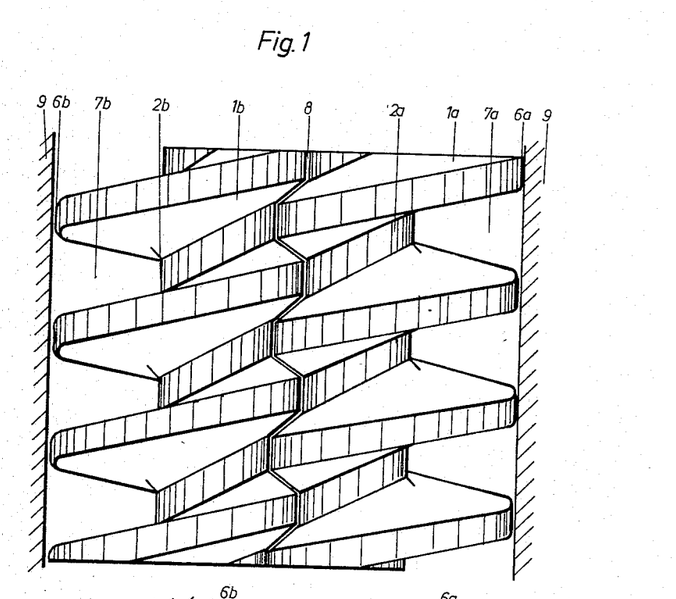
FIG. 1 is a longitudinal section through a double screw mounted in a common housing. The central axes of the flight lands and the central axes of the cores of both the intermeshing screws are arranged eccentrically relative to the spindles driving the screws.
Figure 2:
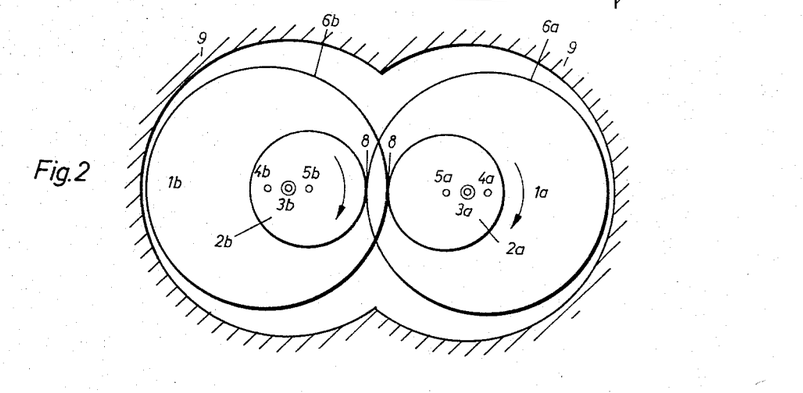
FIGS. 2, 3, 4 and 5 are cross-sections through the double screw shown in FIG. 1 in four different stages of rotation.
Figure 3:
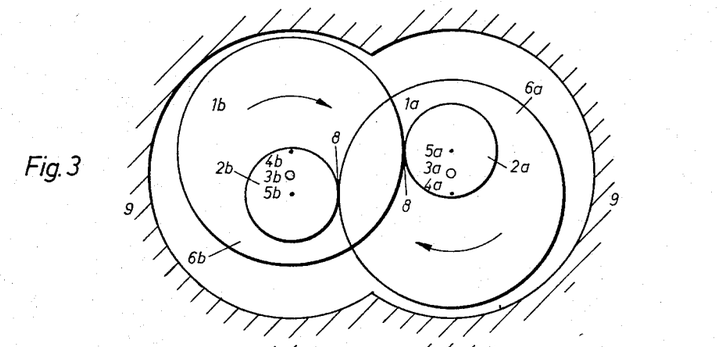
Figure 4:
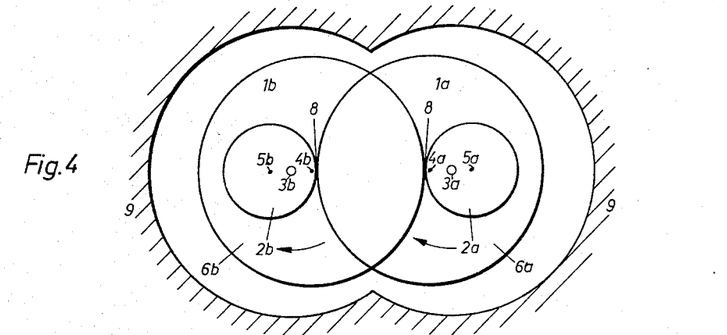
Figure 5:
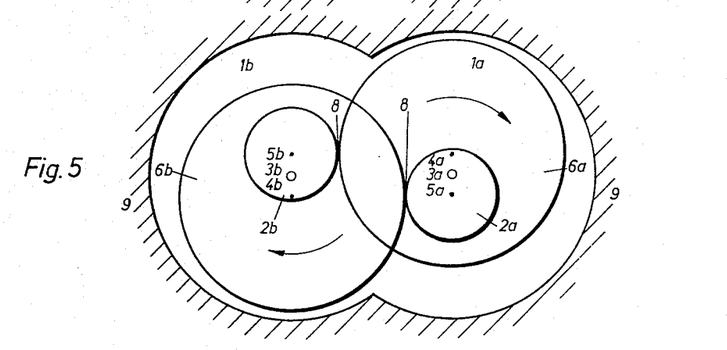
Figure 6:
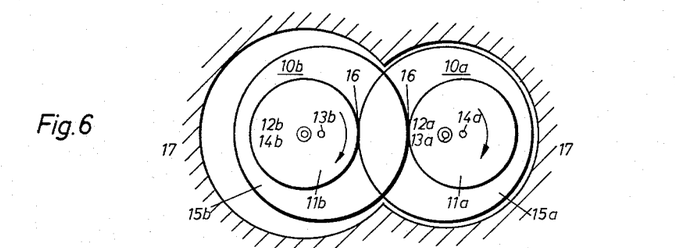
FIGS. 6, 7, 8 and 9 are cross-sections through a pair of screws in four different stages of rotation. The central axis of the flight land of one of the intermeshing screws coincides with the spindle driving the screw, whilst the central axis of the core of the adjacent screw coincides with the spindle driving this screw.
Figure 7:
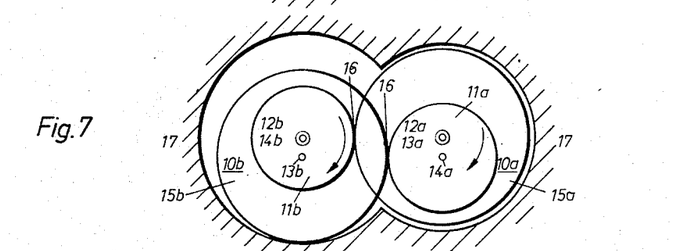
Figure 8:
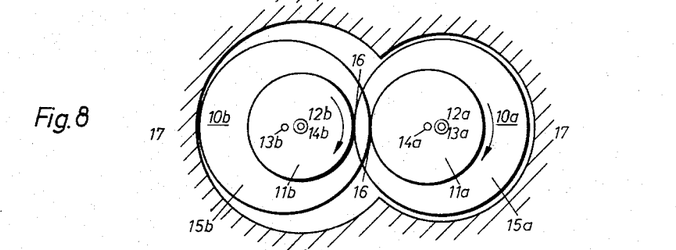
Figure 9:
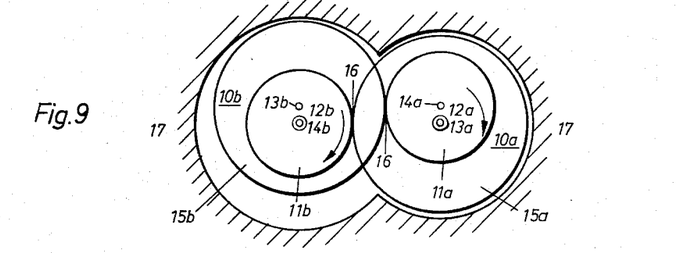
Figure 10:
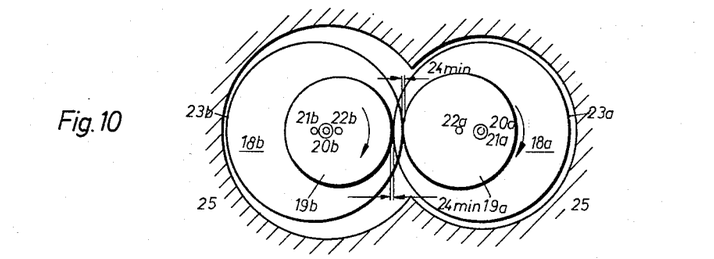
FIGS. 10, 11, 12 and 13 are cross-sections through a pair of screws shown in four different stages of rotation. The central axis of the flight lands of one of the screws coincides with the spindle by which it is driven, whilst the central axis of the core of the adjacent screw, as well as the central axis of the flight land, are arranged eccentrically relative to the spindle by which this screw is driven.
Figure 11:
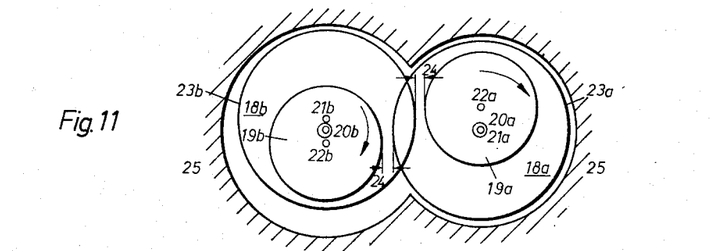
Figure 12:
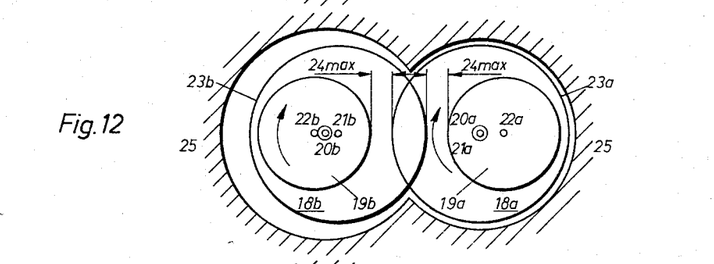
Figure 13:
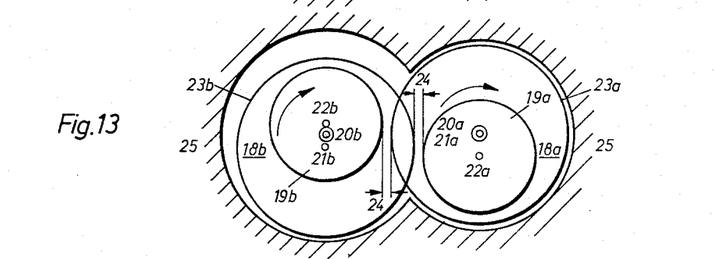
Figure 14:
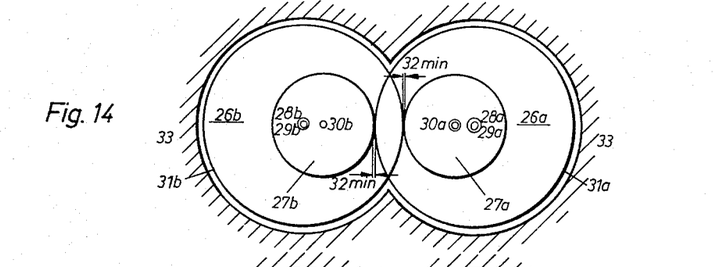
FIGS. 14, 15, 16 and 17 are cross-sections through intermeshing screws shown in four different stages of rotation. In this case, the central axes of the flight lands coincide with the spindles by which the screws are driven, the central axis of the flight land, are arranged eccentric-centrically relative to the driving spindles.
Figure 15:
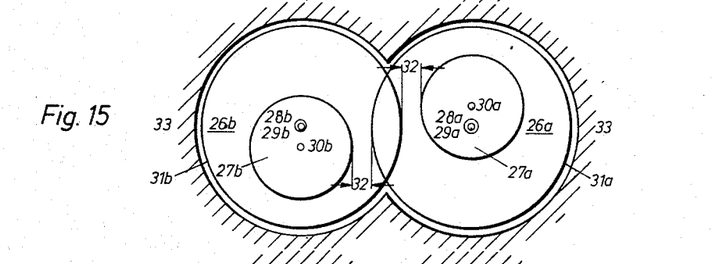
Figure 16:
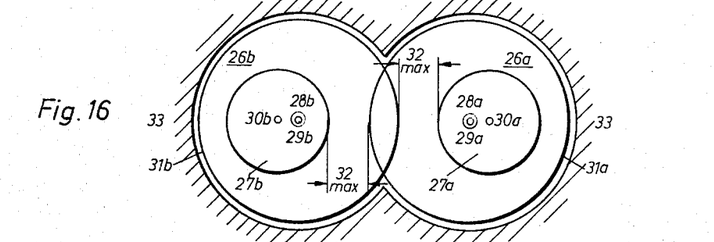
Figure 17:
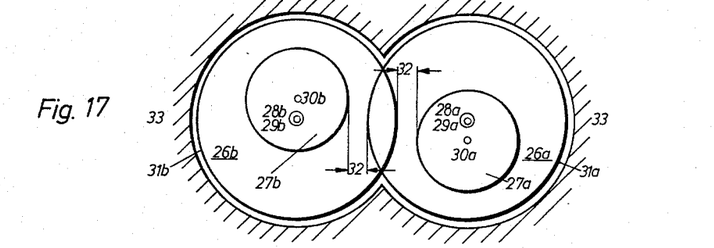

Referring now to FIG. 1, at least two screws are arranged in a common housing in such a way that the central axes of the cores 5a and 5b (FIG. 2) are arranged eccentrically relative to the driving spindles 3a and 3b (FIG. 2) rotating in the same direction, so that the flight lands 6a of one screw 1a engage in the grooves 7b of the adjacent screw 1b (FIG. 1).

If the central axes of the cores 5a and 5b (FIGS. 2 to 5) are arranged eccentrically relative to the driving spindles 3a and 3b, the distances of the central axis of the flight land 4a from the central axis of the core 5b and of the core 5a from the central axis of the flight land 4b of the adjacent screw 1b respectively, are always equal to the distance between the driving spindles 3a and 3b. Under these conditions, the gap 8 between 6a and 7b and, conversely, the gap 8 between 6b and 7a (FIG. 1) disappears, so that the flight land of one screw slides on the core of the adjacent screw, and vice versa.

These screws automatically clean themselves during operation, so that no residue can be left behind in them, which otherwise might have an unfavourable influence on the residence time distribution i.e. no material is retained in the apparatus for a period greatly in excess of the average time the material being treated will remain in the apparatus. In this embodiment, the gap between the flight lands of the two screws, and the housing wall changes continuously during one revolution of the screws.

In another embodiment of the invention shown in FIGS. 6, 7, 8 and 9, the central axis of the flight land 13a coincides with the spindle 12a driving the screw 10a, (FIG. 6), whilst the central axis of the core 14b of the immediately adjacent screw 10b coincides with the driving spindle 12b. This embodiment, too, is distinguished by the fact that the contact gap 16 (FIG. 6) between the flight lands and the grooves of the adjacent screw disappears, with the result that the threads of both screws are self-cleaning. In addition, the gap between the housing and one of the screws, i.e. 10a (FIG. 6) is constant, whilst the gap between the housing and the adjacent screw 10b (FIGS. 6 to 9) changes continuously during one revolution of the screw, so that a continuously changing, crescent-shaped space is formed during the rotation of the screw.

According to another embodiment, shown in FIGS. 10, 11, 12 and 13, the central axis of the flight land 21a of one screw 18a (FIG. 10) coincides with the driving spindle 20a whilst, in the case of the adjacent screw 18b, both the central axis of the core 22b and the central axis of the flight land 21b are arranged eccentrically relative to the driving spindle 20b. As shown in FIGS. 10 to 13, the width of the contact gap 24 between the flight lands and the grooves of the adjacent screws, changes from a minimum to a maximum and back to a minimum during one revolution of the two screws. In this case, too, the wall of the housing surrounds the screw 18a and, with the adjacent screw 18b, forms a crescent-shaped space which varies as the screw rotates.

If, as in another embodiment of the invention, as shown in FIGS. 14 to 17, the central axes of the flight lands 29a and 29b of the two screws 26a and 26b coincide with the driving spindles 28a and 28b, and if each of the central axes of the cores 30a and 30b is arranged eccentrically relative to the driving spindles 28a and 28b, the wall of the housing surrounds both the screws at a short, but uniform distance (cf. FIGS. 14 to 17) and the contact gap 32 between the flight lands and the grooves of the adjacent screws undergoes a change in length from a minimum to a maximum and back to a minimum during one revolution.

These various embodiments of the screw machine embrace such a wide field of application that the machine may be adapted to any type of composition, to be worked, whether in liquid, plastic or powder form, and may be used for any purpose, for example as a continuously operating and delivering stirrer, mixer, kneader, grinder or dissolver, or even as a combination thereof. In such apparatus, the transmission of a considerable shearing force to very small areas of the composition to be worked, combined with uniform delivery, in each self-cleaning thread of the screw, makes this machine suitable for reaction such as, for example, polymerisation and condensation reactions even with solid end products, and for moulding purposes.

Figure 18:
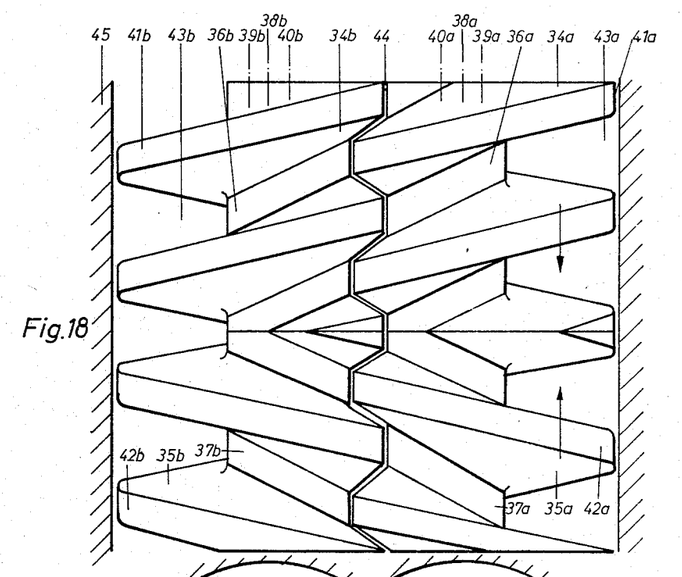
FIG. 18 is a longitudinal section and FIG. 19 a corresponding cross-section through a pair of screws, each of which comprises at least two screw sections which deliver or convey in opposite directions.
Figure 19:
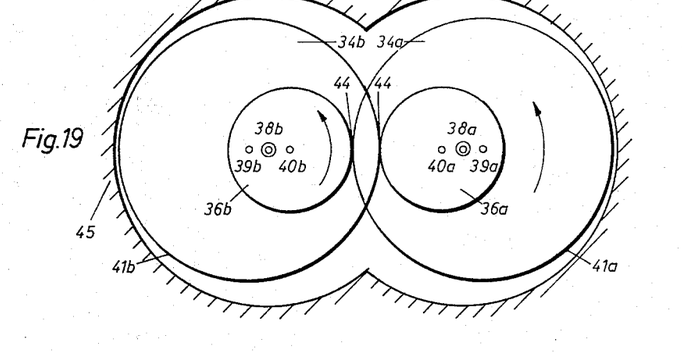

In a further development of the machine, each of the two adjacent screws comprises at least two screws 34a and 35a and 34b and 35b (FIG. 18) which are mounted on one and the same driving spindle and which are opposite in pitch. FIG. 18 is a longitudinal section and FIG. 19 a cross-section through this embodiment. Although the screws 34a and 35a and 34b and 35b rotate in the same direction, they deliver or convey in opposite directions (FIG. 18). In this embodiment the pair of intermeshing screws 34a and 34b have a greater rate of delivery and thus determine the direction in which the composition to be worked is delivered. As shown in FIGS. 18 to 19, this embodiment is distinguished by the fact that the gap 44 between the flight land 41a and the core 36b and between the core 36a and the flight land 41b, disappears. The same applies as regards the pair of contra-rotating screws, in whose case the gap between the flight land 42a and the core 37b and between 42b and 37a, disappears, i.e. the flight lands and the grooves of the adjacent pairs of screws slide on one another (cf. FIG. 19).

The other embodiments, as illustrated in FIGS. 6 to 17, are also readily applicable to the screw comprising two portions of opposite pitch. Since, in this screw machine, the contra-rotating screws create an additional shearing force which is superimposed on the intensive shearing forces set up in screw threads, particularly intensive stirring, mixing and kneading effects occur in very small areas of the liquids, viscous or plastic compositions and powders to be processed or worked, despite a very limited residence time range. These machines are particularly suitable for carrying out chemical reactions of a general nature.

Figure 20:
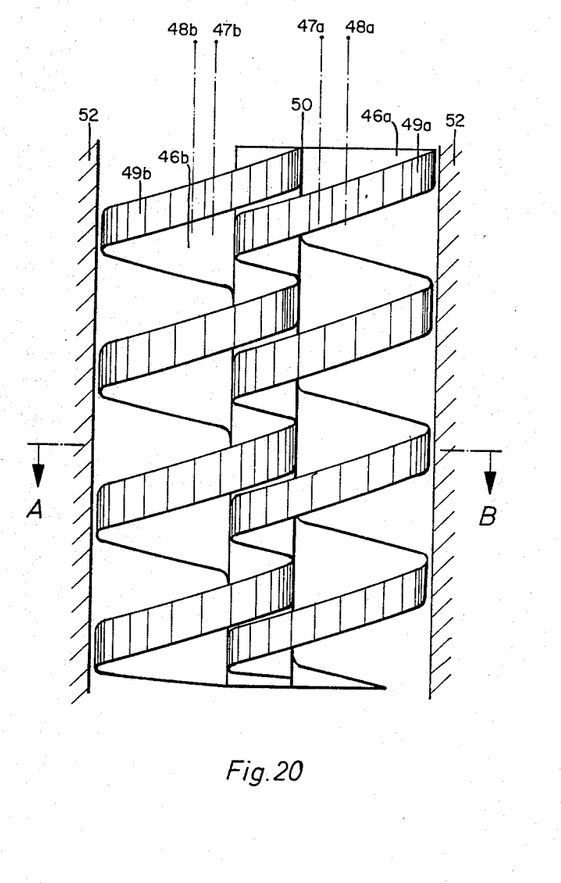
FIG. 20 is a longitudinal section through a coreless pair of screws, whilst
Figure 21:
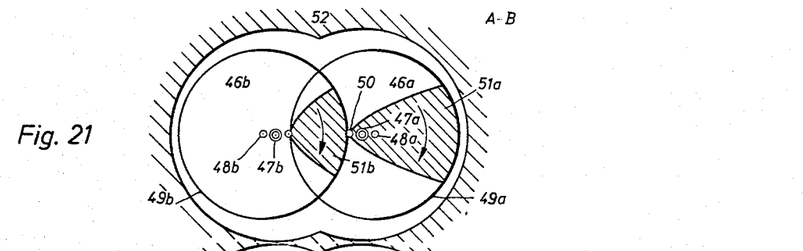
FIGS. 21, 22, 23 and 24 are cross-sections through the pair of core-less screws in four different stages of rotation. The central axis of the coreless, continuous helical surface of each screw is arranged eccentrically relative to the spindle by which the screw is driven.
Figure 22:
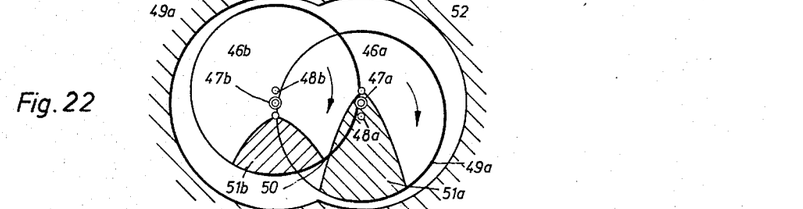
Figure 23:
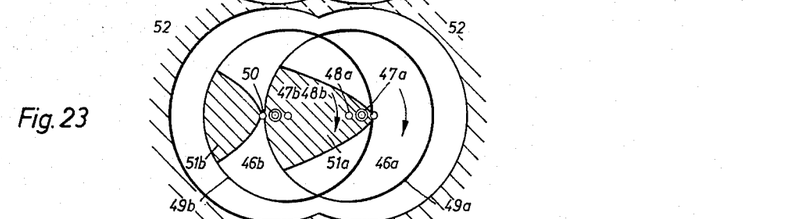
Figure 24:
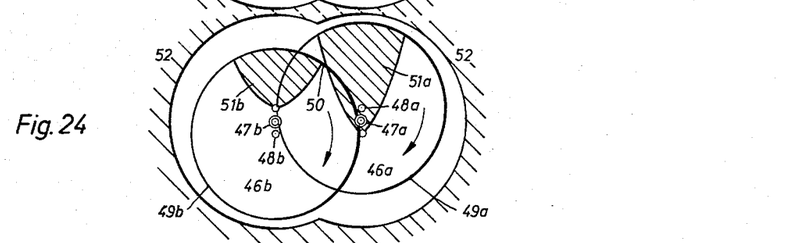

FIG. 20 is a longitudinal section and FIGS. 21 to 24 are cross-sections through another embodiment of the screw machine according to the invention. In this embodiment, two screws 46a and 46b, which are in the form of core-less continuous helical surfaces and whose central axes 48a and 48b are arranged eccentrically relative to the driving spindles 47a and 47b, alternately engage in the grooves formed as helical surfaces in the adjacent screws in such a way that the contact gap 50 between the flight lands and the grooves of the adjacent screws disappears, and the flight lands slide on the helical surfaces (cf. FIGS. 20 to 24).

This screw machine with its various embodiments may also be used for a number of purposes, but particularly for drying under heat and for evaporating monomeric and other volatile constituents from the viscous compositions while, at the same time, stirring or mixing them.

Figure 25:
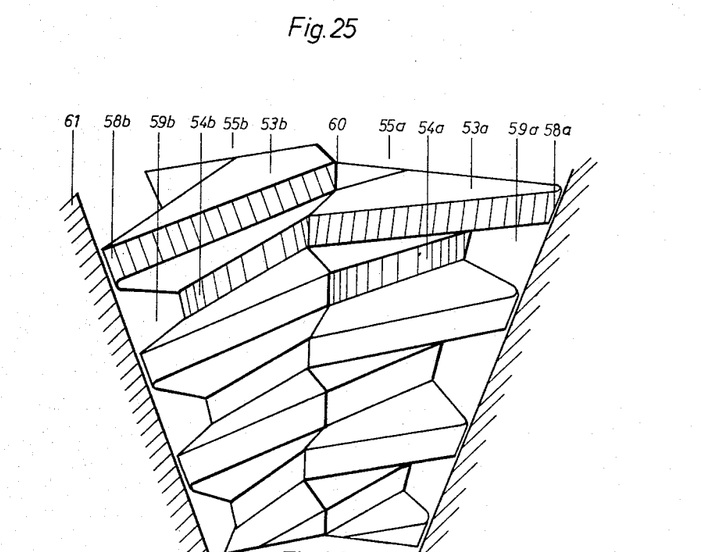
FIG. 25 is a longitudinal section and FIG. 26 a cross-section through a pair of screws, each of which is in the form of a conical screw.
Figure 26:
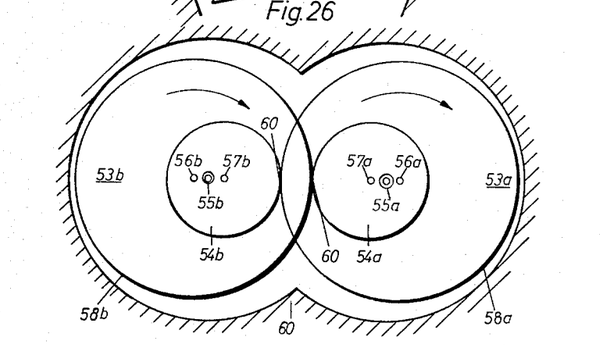

In cases where each of the adjacent screws is conical and their axes converge (cf. FIG. 25) so that the flight land 58a engages in the groove 59b in such a way that the flight lands 58a and 58b slide on the cores 54b and 54a, respectively, and the contact gap between the flight lands and the grooves of the adjacent screw disappears, a screw machine is obtained (cf. FIG. 26) which not only mixes and kneads well, but is also particularly suitable for the mechanical separation of liquids, in cases where the housing wall is in the form of a screen or perforated plate.

Figure 27:
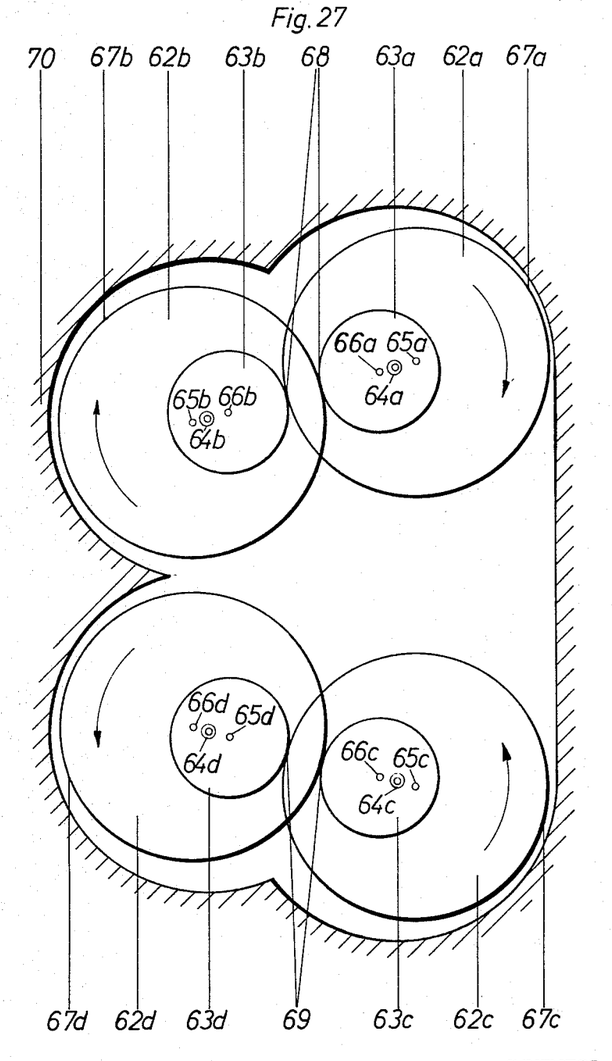
FIG. 27 is a cross-section through two pairs of screws, the planes of the spindles driving each pair of screws being inclined relative to one another.

The screws referred to in the foregoing may be differently mounted in the housing 70 surrounding them, in such a way that the driving spindles 64a–d of all the screws are arranged in one plane, or, for example, in such a way that pairs of driving spindles are arranged in one plane, or even in such a way that, as shown in FIG. 27, the planes of the driving spindles 64a and 64b, or 64c and 64d of the pairs of screws 62a and 62b or 62c and 62d are inclined relative to one another, which case pairs of screws, or even all the screws, may rotate in the same direction.

Apart from intensive stirring, mixing and kneading, this arrangement of the screws in one housing not only enables compositions to be dried under heat or solutions to be concentrated, it also enables monomeric and other volatile components to be evaporated off from the compositions. Finally, it is possible by means of this arrangement of the screws to carry out distillation in the presence of steam, accompanied by the action of intense shearing forces and by mixing and kneading, in which case heat may be transferred very favourably to the compositions to be worked, if they are to be dried or evaporated, by suitable choice of the embodiments.

I claim:

1. A machine for working and simultaneously delivering liquid, viscous or plastic compositions and powders, which comprises at least two screws which are arranged in a common housing and which are each provided with an eccentric core wherein the central axes of the cores of the adjacent screws are arranged eccentrically relative to the spindles rotating in the same direction by which the screws are driven, in such a way that the flight lands of one screw engage in the grooves of the adjacent screw.

2. A machine as claimed in claim 1 wherein the central axes of the flight lands are also arranged eccentrically relative to the spindles driving the screws.

3. A machine as claimed in claim 1 wherein the flight lands of one screw slide on the core of the adjacent screw.

4. A machine as claimed in claim 1 wherein the central axes of the flight lands and the central axes of the cores of the intermeshing screws are arranged eccentrically relative to the spindles driving the screws, so that the distances of the central axes of the flight land and of the core of one screw from the central axes of the core and of the flight land of the adjacent screws, are always equal to the distance between the driving spindles.

5. A machine as claimed in claim 1 wherein the central axis of the flight lands of one of the intermeshing screws coincide with the spindle by which this screw is driven, whilst the central axis of the core of the adjacent screw coincides with the spindle by which it is driven.

6. A machine as claimed in claim 4 wherein the central axis of the flight lands of one of the intermeshing screws coincide with the spindle by which the screw is driven, whilst the central axis of the core of the adjacent screw and the central axis of the flight land are arranged eccentrically relative to the spindle by which this screw is driven.

7. A machine as claimed in claim 1 wherein the central axes of the flight lands of the intermeshing screws coincide with the spindles driving the screws, each of the central axes of the core being arranged eccentrically relative to the driving spindles.

8. A machine as claimed in claim 4 wherein each of the adjacent screws comprises at least two screw sections delivering in opposite directions.

9. A machne as claimed in claim 4 wherein each of the adjacent screws is in the form of a conical screw.

10. A machine for working and simultaneously delivering liquid, powder, plastic, viscous compositions and like materials, which comprises a plurality of screws arranged in a common housing and disposed for rotation relative thereto in the same direction about the axes of associated individual drive spindles, said screws each being core-less and having flights defined by a continuous helical surface the central axis of which is disposed eccentrically with respect to the drive spindle axis associated therewith, said screws being disposed for intermeshing engagement in groups of at least two screws each.

11. A machine for working and simultaneously delivering liquid, powder, plastic, viscous compositions and like materials, which comprises at least two pairs of screws arranged in a common housing and disposed for rotation relative thereto in the same direction about the mutually parallel axes of associated individual drive spindles, said screws each having an eccentric core the central axis of which is disposed eccentrically with respect to the drive spindle axis associated therewith, with the screws of each pair being disposed for intermeshing engagement with one another.

12. The machine according to claim 11 wherein the planes defined by the parallel drive spindle axes associated with each pair of intermeshing screws are intersecting planes.

References Cited by the Examiner

UNITED STATES PATENTS

| 2,026,306 | 12/1935 | Franklin | 103—128 |
| 2,410,341 | 10/1946 | Delamere | 230—143 |
| 2,670,188 | 2/1954 | Erdmenger | 103—128 |

FOREIGN PATENTS

| 290,452 | 5/1928 | Great Britain. |

MARK NEWMAN, *Primary Examiner.*

WILBUR J. GOODLIN, *Examiner.*